United States Patent
Diehl et al.

(10) Patent No.: US 10,724,482 B2
(45) Date of Patent: Jul. 28, 2020

(54) AIR CLEANER CONNECTING TUBE STRUCTURE

(71) Applicant: Honda Motor Co., Ltd., Tokyo (JP)

(72) Inventors: Russell A. Diehl, Dublin, OH (US); Tadashi Oshima, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 15/888,279

(22) Filed: Feb. 5, 2018

(65) Prior Publication Data

US 2019/0242334 A1    Aug. 8, 2019

(51) Int. Cl.
*F02M 35/02* (2006.01)
*B01D 46/52* (2006.01)

(52) U.S. Cl.
CPC ....... *F02M 35/0204* (2013.01); *B01D 46/521* (2013.01); *B01D 2279/60* (2013.01)

(58) Field of Classification Search
CPC .............. B01D 46/521; B01D 2279/60; F02M 35/0204; F02M 35/162; F02M 35/10137; F02M 35/10039; F02M 35/10032
USPC ...... 55/385.3, 357, 498, 502, 497, 337, 383, 55/419, 495, 520, DIG. 28, DIG. 30; 123/198 E, 184.21, 184.53; 180/68.1, 180/68.3
See application file for complete search history.

(56) References Cited

U.S. PATENT DOCUMENTS

| | | |
|---|---|---|
| 2,701,998 A | 2/1955 | Wulle |
| 6,745,586 B1 | 6/2004 | Reimann et al. |
| 8,377,161 B2 * | 2/2013 | Lee .......................... F02F 7/006 123/198 E |
| 8,839,756 B2 * | 9/2014 | Ozaki .............. F02M 35/10091 123/184.53 |
| 9,046,065 B2 | 6/2015 | Chang et al. |
| 9,725,023 B2 * | 8/2017 | Miller ....................... B60P 1/04 |
| 9,745,924 B2 * | 8/2017 | Navaliger .......... F02M 35/0201 |
| 9,795,907 B2 * | 10/2017 | Crary ................. B01D 46/0005 |
| 10,208,717 B2 * | 2/2019 | Iwamoto ................ F02M 35/10 |
| 10,508,625 B2 * | 12/2019 | Kontani ............. F02M 35/0201 |

(Continued)

FOREIGN PATENT DOCUMENTS

| | | |
|---|---|---|
| CN | 100357588 C | 12/2007 |
| CN | 106274371 A | 1/2017 |

(Continued)

OTHER PUBLICATIONS

"Classic Auto Air's Perfect Fit A/C for '67-72 Chevys" http://www.hotrod.com/articles/0904clt-1967-1972-chevy-trucks-air-conditioning-installation/.

*Primary Examiner* — Minh Chau T Pham
(74) *Attorney, Agent, or Firm* — Honda Patents & Technologies North America, LLC; Mark E. Duell (57) ABSTRACT

An air cleaner of a vehicle for filtering particulate matter from air supplied through an intake includes a case with an outlet. The case surrounds the air cleaner, which further includes two connecting tubes each having a first end disposed through the outlet and a second end located in the case. A funnel is clamped to the second end of each of the connecting tubes. A bracket is attached to each of the funnels for rigidly mounting the funnels inside the case of the air cleaner. The first end of each of the connecting tubes is further connected to the throttle body of the vehicle to provide clean air from the air cleaner to the engine.

20 Claims, 8 Drawing Sheets

(56) References Cited

U.S. PATENT DOCUMENTS

| | | | | |
|---|---|---|---|---|
| 2003/0029145 A1* | 2/2003 | Sudoh | ............... | B01D 46/0004 |
| | | | | 55/418 |
| 2008/0053394 A1* | 3/2008 | Tsutsui | ............... | F02M 35/162 |
| | | | | 123/184.21 |
| 2009/0084344 A1* | 4/2009 | Fasan | ............... | B60K 13/02 |
| | | | | 123/198 E |
| 2009/0241868 A1* | 10/2009 | Morita | ............... | B62K 11/04 |
| | | | | 123/54.4 |
| 2010/0050865 A1* | 3/2010 | Johnson | ............... | B01D 46/002 |
| | | | | 95/17 |
| 2011/0232983 A1* | 9/2011 | Abe | ............... | B01D 46/0005 |
| | | | | 180/68.3 |
| 2017/0284346 A1 | 10/2017 | Kontani et al. | | |

FOREIGN PATENT DOCUMENTS

| | | | |
|---|---|---|---|
| DE | 19846194 | A1 | 4/2000 |
| DE | 10339082 | A1 | 3/2005 |
| DE | 102005055479 | A1 | 5/2007 |
| EP | 2017458 | A2 | 1/2009 |
| JP | H07115578 | B2 | 12/1995 |
| JP | 5883742 | B2 | 3/2016 |
| KR | 101666562 | B1 | 10/2016 |
| WO | 2005045236 | A1 | 5/2005 |
| WO | 2017144284 | A1 | 8/2017 |

\* cited by examiner

AIR CLEANER CONNECTING TUBE STRUCTURE

TECHNICAL FIELD

The embodiments disclosed herein are related to an air cleaner for a vehicle, and more specifically to a duct system of connecting tubes connecting the air cleaner to an engine of the vehicle.

BACKGROUND

Vehicles powered by internal combustion engines may typically include an air cleaner. The air cleaner includes a filter, an air inlet that supplies a flow of air from outside of the vehicle to the air cleaner, and an outlet that supplies a flow of filtered air to the engine. The air flows through the filter in the air cleaner to filter out particulate matter. The air cleaner includes a ducting system for directing the flow of air through the outlet to the throttle body of the engine for use as combustion air.

The air cleaner is typically located in an engine compartment of the vehicle. The volume and height of the air cleaner may impact air induction performance. A larger volume and/or a greater height of the air cleaner provides better induction pressure performance. However, the volume and/or height of the air box cleaner assembly are typically limited by packaging and space considerations. Therefore, an improved duct system is necessary to achieve maximum performance while accounting for limited space in the engine compartment.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, an intake for an air cleaner of a vehicle, the air cleaner having a case with an outlet, includes a first connecting tube, the first connecting tube having a first end disposed through the outlet and a second end located in the case, a first funnel mounted to the second end of the first connecting tube, and a first bracket attached to the first funnel and to the case.

According to another aspect, the intake further including a second connecting tube, the second connecting tube having a first end disposed through the outlet and a second end located in the case, a second funnel mounted to the second end of the second connecting tube, and a second bracket attached to the second funnel and to the case.

According to yet another aspect, an air cleaner of a vehicle, the air cleaner having a case with an outlet, the case surrounding the air cleaner, includes a first connecting tube, the first connecting tube having a first end disposed through the outlet and a second end located in the case, a second connecting tube, the second connecting tube having a first end disposed through the outlet and a second end located in the case, a first funnel clamped to the second end of the first connecting tube, and a second funnel clamped to the second end of the second connecting tube.

According to still another aspect, the air cleaner further includes a first bracket attached to the first funnel and to the case, and a second bracket attached to the second funnel and to the case.

According to still yet another aspect, a vehicle, includes an air cleaner, the air cleaner having a case with an outlet, the case surrounding the air cleaner, a first connecting tube, the first connecting tube having a first end disposed through the outlet and a second end located in the case, a second connecting tube, the second connecting tube having a first end disposed through the outlet and a second end located in the case, a first funnel clamped to the second end of the first connecting tube, a second funnel clamped to the second end of the second connecting tube, a first bracket attached to the first funnel and to the case, the first bracket partially circumscribing the second end of the first connecting tube, and a second bracket attached to the second funnel and to the case, the second bracket partially circumscribing the second end of the second connecting tube.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
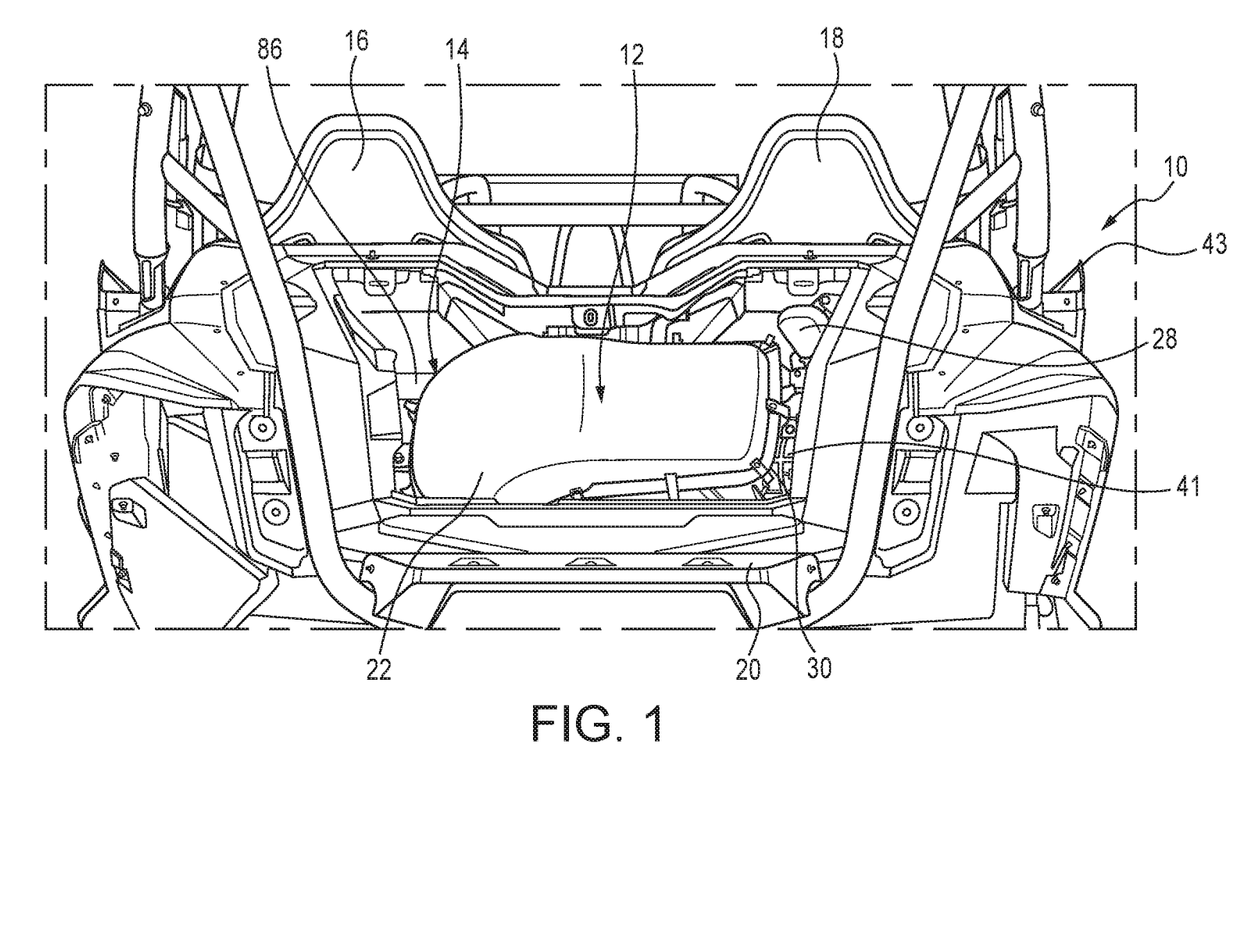
FIG. 1 is rear view of a portion of the rear of a motor vehicle showing the location of an air cleaner.
Figure 2:
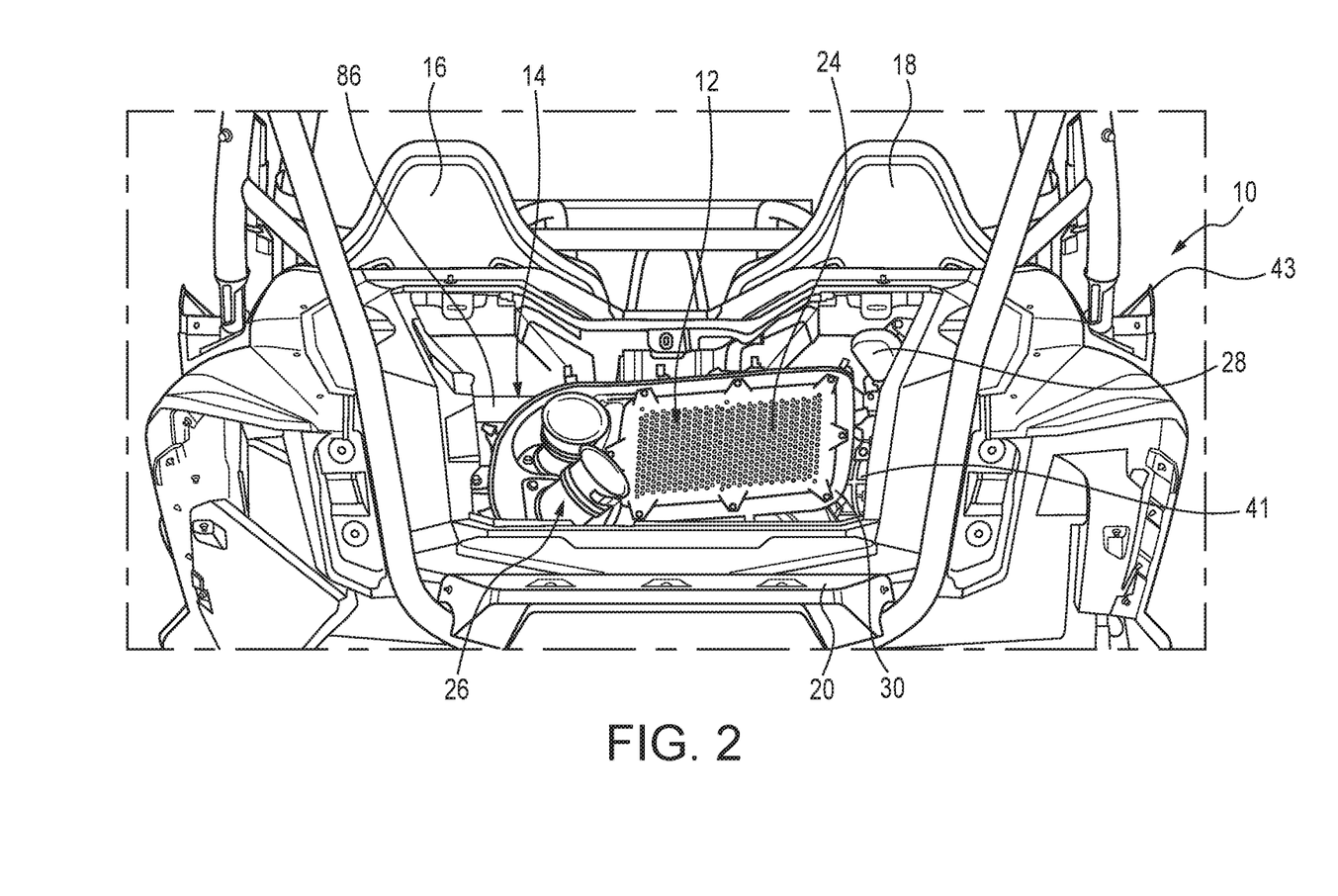
FIG. 2 is the rear view of the motor vehicle of FIG. 1 showing the air cleaner with a lid removed.

FIG. 1 is rear-view illustration of an air cleaner 12 located in the engine compartment 14 of a vehicle 10, particularly of the type known as an all-terrain vehicle ("ATV") or a side-by-side vehicle ("SxS"). In the vehicle 10 illustrated in FIG. 1, the engine compartment 14 is located behind and below the driver seat 16 and front passenger seat 18 of the vehicle 10, and longitudinally forward of a bed 20. The air cleaner 12 may include a metal or plastic case 30 which may incorporate ducting 28 to provide cool and/or warm air from the intake 43, and with a lid 22 made of metal or plastic. FIG. 2 is a view of FIG. 1, illustrating the air cleaner 12 with the lid 22 removed. Most fuel-injected vehicles, including vehicle 10, use a pleated paper air filter 24 located inside the air cleaner 12 connected to the throttle body 80 by a duct system 26. Other vehicles that use carburetors or throttle body fuel injection typically use a cylindrical air filter, usually a few inches high and between 6 inches (150 mm) and 16 inches (410 mm) in diameter located above the carburetor or throttle body. In order to provide air to the engine, an intake 43 is provided to deliver air from outside the engine compartment 14 to the air cleaner 12, and then through the duct system 26 to the engine.

Figure 3:
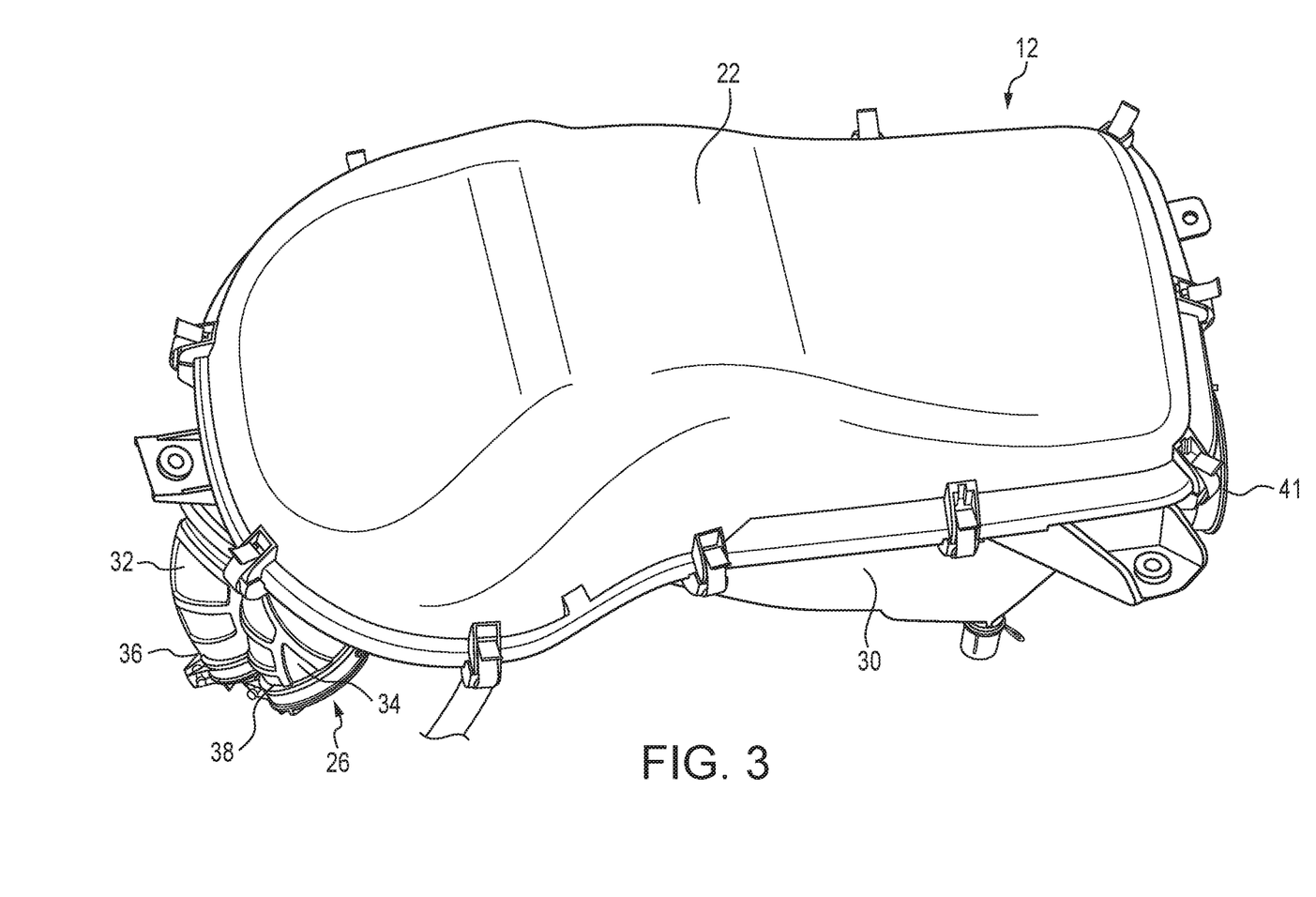
FIG. 3 is a perspective view of the air cleaner as illustrated in FIG. 1.
Figure 4:
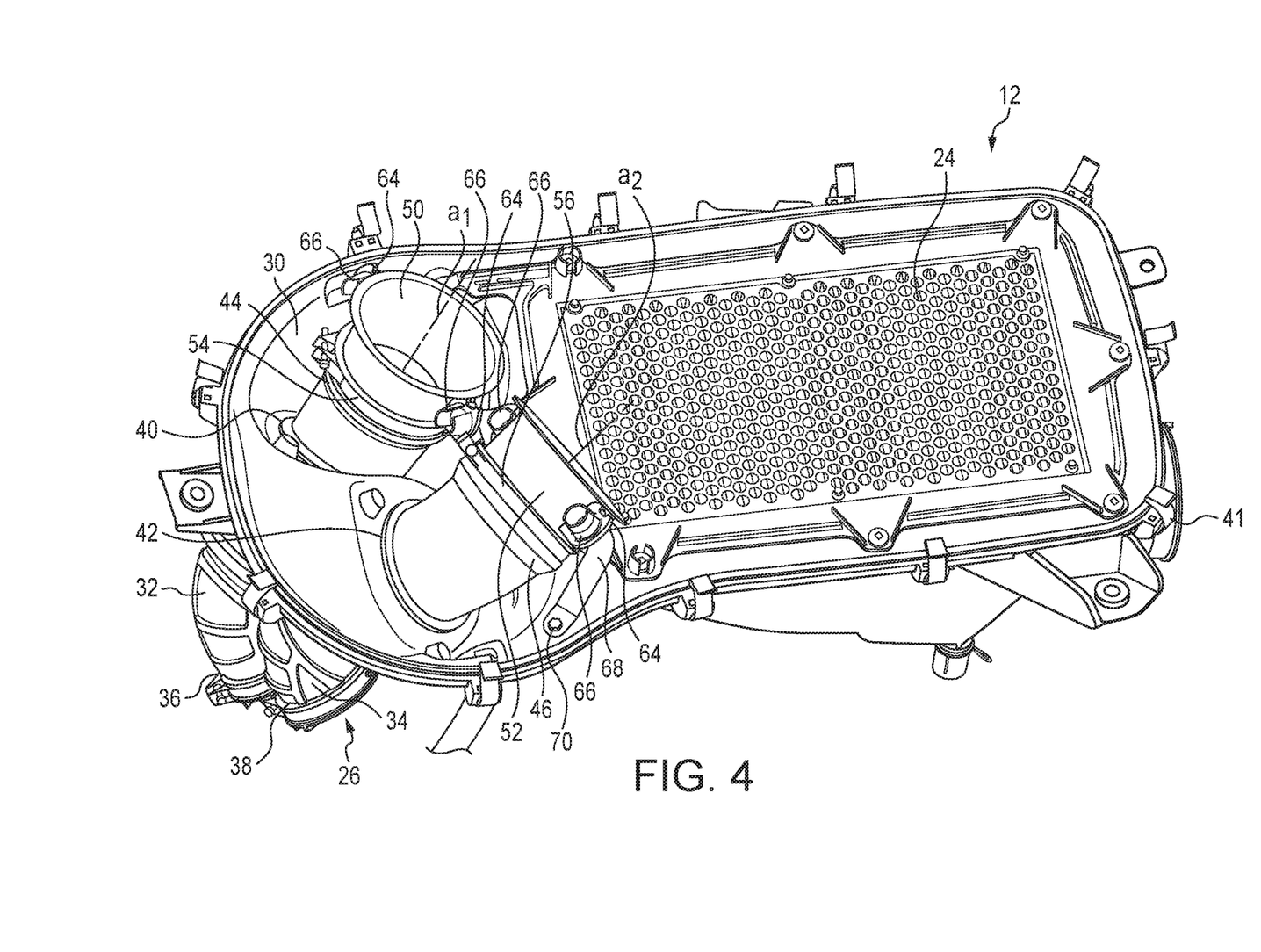
FIG. 4 is a perspective view of the air cleaner as illustrated in FIG. 2 with the lid removed to show the interior of the air cleaner.
Figure 5:
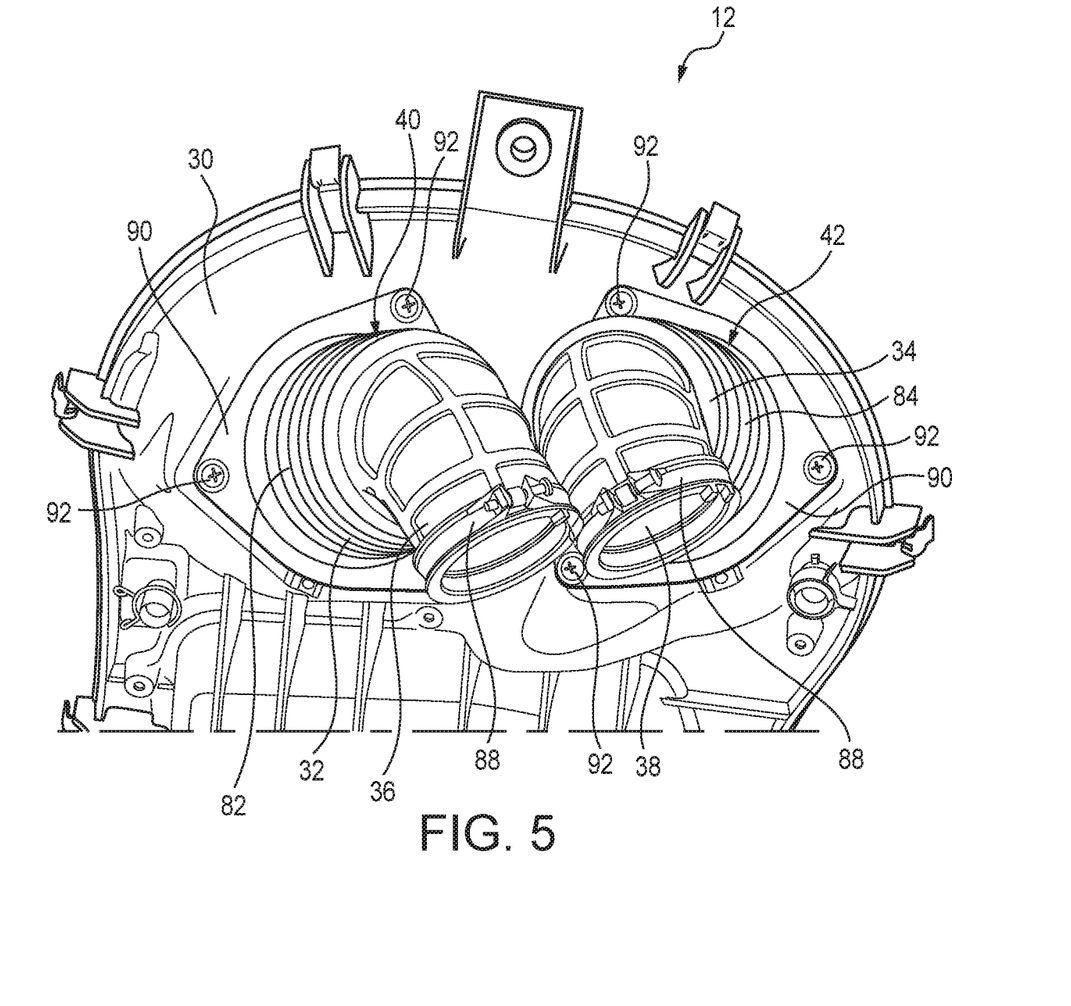
FIG. 5 is a bottom perspective view of the air cleaner of FIG. 3.

One embodiment of the air cleaner 12 is illustrated in FIGS. 3-5. FIG. 3 shows a close up exterior view of the air cleaner 12 viewed from the top of the air cleaner 12, FIG. 4 shows a close up view of the interior of the air cleaner 12 with the lid 22 removed, and FIG. 5 shows a bottom view of the air cleaner 12. The duct system 26 includes first and second connecting tubes 32, 34, each having first ends 36, 38. The first end 36 of the first connecting tube 32 extends through a first orifice 40 in the case 30 of the air cleaner 12, and the first end 38 of the second connecting tube 34 extends through a second orifice 42 in the case 30 of the air cleaner 12. The first and second orifices 40, 42 collectively form an outlet of the air cleaner 12. The first and second connecting tubes 32, 34 may be constructed of a flexible, injection molded rubber or any other suitable material.

As illustrated in FIG. 4, at a distal second end 44 of the first connecting tube 32 is located a first funnel 50, and at a distal second end 46 of the second connecting tube 34 is located a second funnel 52. Each of the first and second funnels 50, 52, which may be constructed of injection-molded plastic or any other suitable materials, is seated in the second ends 44, 46 of the respective first and second connecting tubes 32, 34. The first funnel 50 is secured by a first circular clamp 54 that circumscribes both the first funnel 50 and the second end 44 of the first connecting tube 32, and the second funnel 52 is secured by a second circular clamp 56 that circumscribes both the second funnel 52 and the second end 46 of the second connecting tube 34. The first and second circular clamps 54, 56 create a frictional interference fit to hold the first and second funnels 50, 52 in the second ends 44, 46 of the respective first and second connecting tubes 32, 34.

The first and second circular clamps 54, 56, in addition to attaching the first and second funnels 50, 52 to the first and second connecting tubes 32, 34, further act to prevent collapse of the first and second connecting tubes 32, 34 and first and second funnels 50, 52 due to pressure fluctuation during high-speed operation of the vehicle 10.

Figure 6:
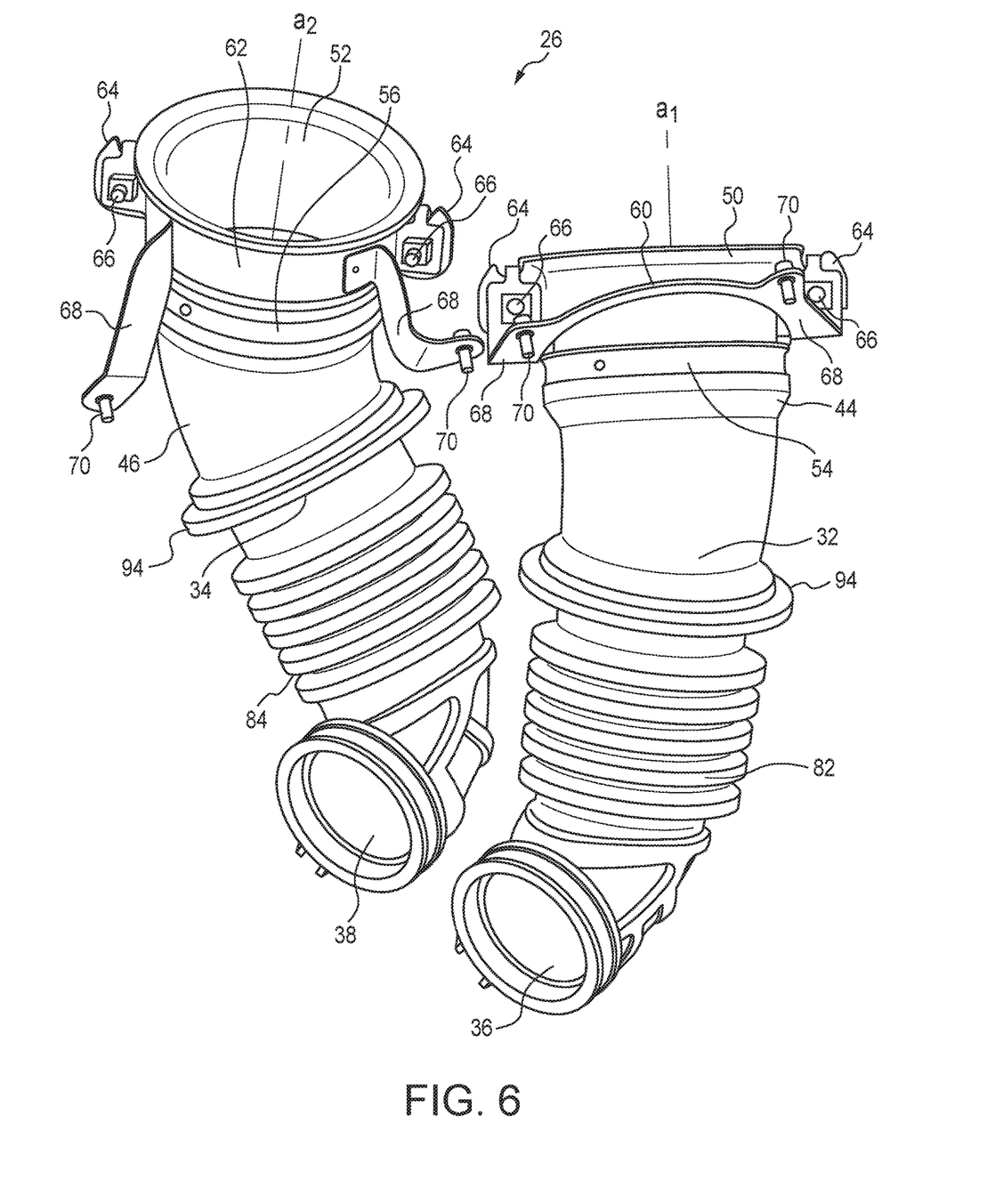
FIG. 6 is a front view of a ducting system of the air cleaner.
Figure 7:
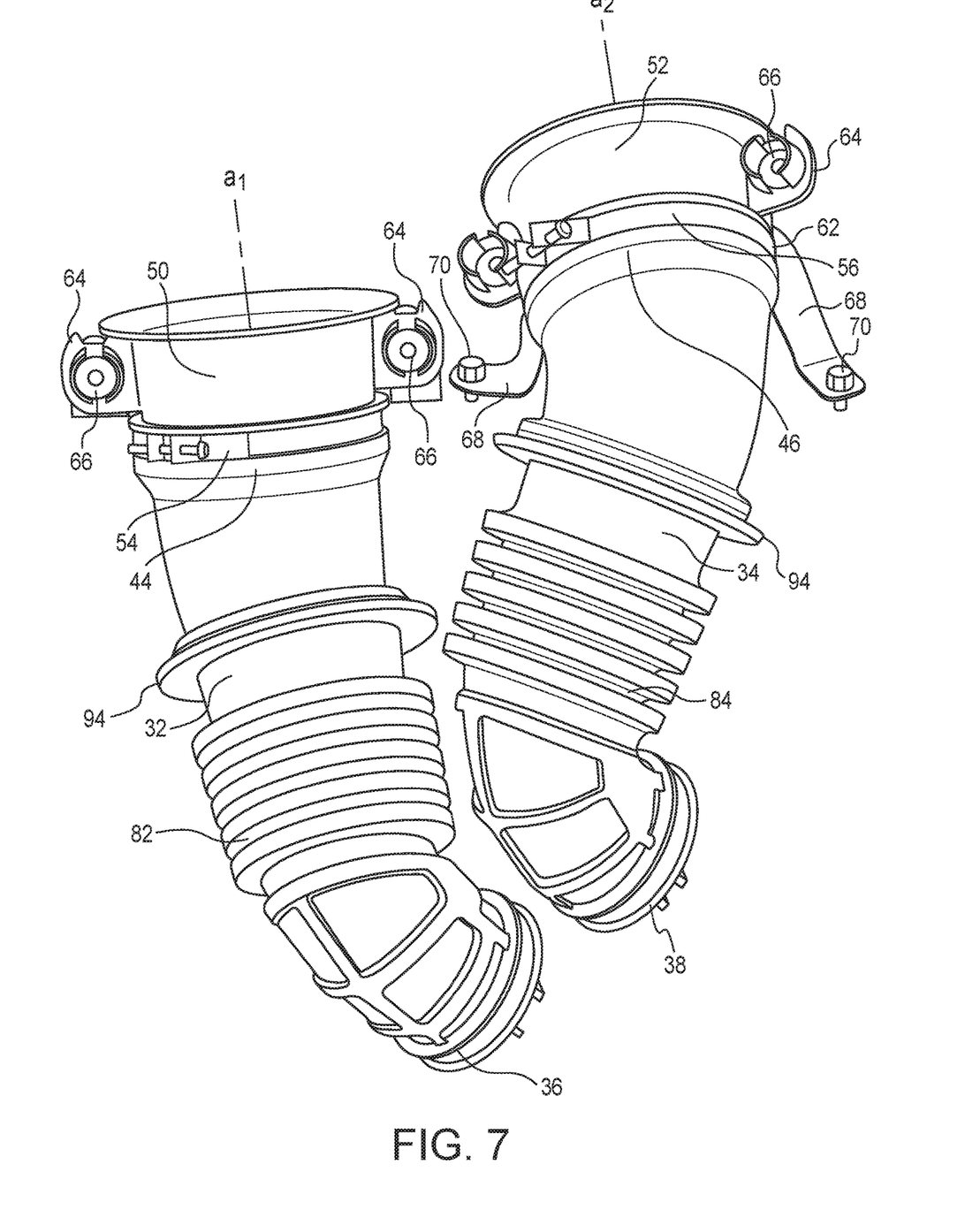
FIG. 7 is a rear view of the ducting system of the air cleaner.

As illustrated in FIGS. 4 and 6-7, the duct system 26 further includes first and second brackets 60, 62 constructed from stamped and formed steel or any other suitable material. The first bracket 60 is connected to the first funnel 50, and the second bracket 62 is connected to the second funnel 52. Each of the first and second brackets 60, 62 partially circumscribe the respective first and second funnels 50, 52. The first bracket 60 is configured to be attached to ribs 64 that extend radially outward in opposite directions from the first funnel 50 by any suitable fastener 66, such as bolts. The second bracket 62 is configured to be attached to two ribs 64 that extend radially outward in opposite directions from the second funnel 52 by any suitable fastener 66, such as bolts. Each of the first and second brackets 60, 62 include extensions 68 that extend into contact with the case 30, and which are further rigidly connected to the case 30 by any suitable fastener 68, such as bolts or rivets, or by any other attachment method, such as welding.

Air enters an inlet 41 of the air cleaner 12 carried from the intake 43 by the ducting 28 that is exposed to the exterior of the vehicle 10. Air passes through the air filter 24 and enters the funnels 50, 52 of the duct system 26 for passage through the outlet consisting of orifices 40, 42 to a throttle body 80 of the engine, illustrated in FIG. 8.

As further illustrated in FIGS. 6-7, the first funnel 50 has a first central axis $a_1$ and the second funnel 52 has a second central axis $a_2$ about which the first and second funnels 50, 52, respectively, are disposed. The first central axis $a_1$ and second central axis $a_2$ are divergent, thereby ensuring each of the first and second funnels 50, 52 receives air as the size and shape of the case 30 and lid 22 may be limited due to packaging considerations. The alignment may also be used to reduce the risk of air pressure fluctuations in a particular direction or location preventing airflow through the duct system 26 to the engine, which could stall the engine.

Figure 8:
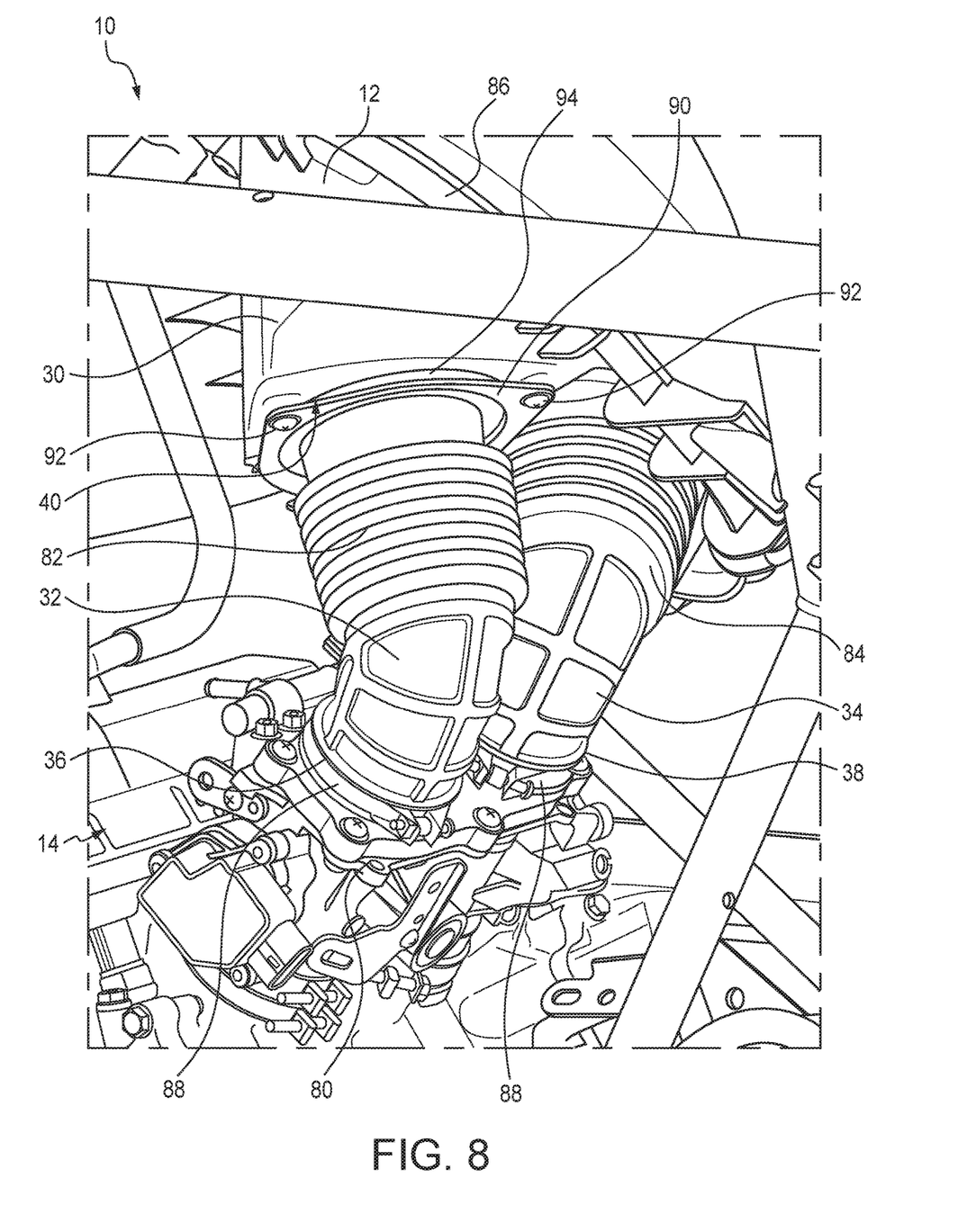
FIG. 8 is a perspective view illustrating the connecting tubes connecting the air cleaner to a throttle body of an engine of the vehicle.

FIG. 8 illustrates the connection of the first ends 36, 38 of the first and second connecting tubes 32, 34 to the throttle body 80 of the vehicle 10. Each of the connecting tubes 32, 34 provides filtered air from the air cleaner 12 to one of the cylinders of the engine of the vehicle 10. The first and second connecting tubes 32, 34 are connected to the throttle body 80 by circular clamps 88 or any other suitable method. Additionally, FIG. 8 illustrates the bellows 82, 84 that form a central portion of the respective first and second connecting tubes 32, 34. The air cleaner 12 is rigidly mounted to the frame 86 of the vehicle 10, while the engine, which includes the throttle body 80, is mounted on rubber engine mounts to absorb engine vibrations. The bellows 82, 84 provide flexibility in the movement of the first and second connecting tubes 32, 34 as the engine and throttle body 80 may flexibly move relative to the rigidly mounted air cleaner 12.

Additionally, as illustrated in FIGS. 5 and 8, the connecting tubes 32, 34 may be further secured to the case 30 by plates 90 that circumscribe the connecting tubes 32, 34 and are attached to the case 30 by suitable fasteners 92, such as screws, bolts, rivets, or the like. Each of the plates 90 may abut a circular rib 94 extending radially outward from each of the connecting tubes 32, 34 above the respective bellows 82, 84. The plates 90 may secure the ribs 94 against the case 30 to secure the connecting tubes 32, 34 within the respective orifices 40, 42 and to provide a seal between the connecting tubes 32, 34 and orifices 40, 42.

While the embodiments illustrated in the FIGS. 3-8 show first and second connecting tubes 32, 34, additional embodiments may feature either one connecting tube in the event a single cylinder engine is applied to the vehicle 10, or more that two connecting tubes in the event more than two cylinders are applied. Further, if an intake manifold were to be applied to the engine, a single connecting tube may be sufficient.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A duct system for an air cleaner of a vehicle, the air cleaner having a case with an outlet, comprising:
   a first connecting tube, the first connecting tube having a first end disposed through the outlet and a second end located in the case;
   a first funnel mounted to the second end of the first connecting tube; and
   a first bracket attached to the first funnel and to the case.

2. The duct system of claim 1 further comprising:
   a second connecting tube, the second connecting tube having a first end disposed through the outlet and a second end located in the case;
   a second funnel mounted to the second end of the second connecting tube; and
   a second bracket attached to the second funnel and to the case.

3. The duct system of claim 2 wherein the first bracket partially circumscribes the second end of the first connecting tube and the second bracket partially circumscribes the second end of the second connecting tube.

4. The duct system of claim 3 wherein the first bracket and second bracket are rigidly mounted to the case.

5. The duct system of claim 4 wherein the first funnel and second funnel are comprised of injection molded plastic.

6. The duct system of claim 5 wherein the first connecting tube and second connecting tube are comprised of injection molded rubber.

7. The duct system of claim 6 further comprising:
   a first clamp for attaching the first funnel to the first connecting tube; and
   a second clamp for attaching the second funnel to the second connecting tube.

8. The duct system of claim 7 wherein each of the first funnel and the second funnel further comprises:
   at least one rib, each of the at least one ribs configured to receive a fastener for attaching the first bracket to the first funnel and the second bracket to the second funnel.

9. The duct system of claim 2 wherein the first funnel has a first central axis and the second funnel has a second central axis and wherein the first central axis and second central axis are divergent.

10. An air cleaner of a vehicle, the air cleaner having a case with an outlet, the case surrounding the air cleaner, comprising:
    a first connecting tube, the first connecting tube having a first end disposed through the outlet and a second end located in the case;
    a second connecting tube, the second connecting tube having a first end disposed through the outlet and a second end located in the case;
    a first funnel attached to the second end of the first connecting tube; and
    a second funnel attached to the second end of the second connecting tube.

11. The air cleaner of claim 10 further comprising:
    a first bracket attached to the first funnel and to the case; and
    a second bracket attached to the second funnel and to the case.

12. The air cleaner of claim 11 wherein the first funnel has a first central axis and the second funnel has a second central axis and wherein the first central axis and the second central axis are divergent.

13. The air cleaner of claim 12 wherein each of the first funnel and the second funnel further comprises:
    at least one rib, each of the at least one ribs configured to receive a fastener for attaching the first bracket to the first funnel and the second bracket to the second funnel.

14. The air cleaner of claim 13 wherein the first bracket partially circumscribes the second end of the first connecting tube and the second bracket partially circumscribes the second end of the second connecting tube.

15. The air cleaner of claim 14 wherein the first bracket and second bracket are rigidly mounted to the case.

16. The air cleaner of claim 15 wherein the first funnel and second funnel are comprised of injection molded plastic.

17. The air cleaner of claim 16 wherein the first connecting tube and second connecting tube are comprised of injection molded rubber.

18. The air cleaner of claim 17 wherein each of the first funnel and the second funnel further comprises:
    two ribs, each of the ribs configured to receive a fastener for attaching the first bracket to the first funnel and the second bracket to the second funnel.

19. A vehicle, comprising:
    an air cleaner, the air cleaner having a case with an outlet, the case surrounding the air cleaner;
    a first connecting tube, the first connecting tube having a first end disposed through the outlet and a second end located in the case;
    a second connecting tube, the second connecting tube having a first end disposed through the outlet and a second end located in the case;
    a first funnel clamped to the second end of the first connecting tube;
    a second funnel clamped to the second end of the second connecting tube;
    a first bracket attached to the first funnel and to the case, the first bracket partially circumscribing the second end of the first connecting tube; and
    a second bracket attached to the second funnel and to the case, the second bracket partially circumscribing the second end of the second connecting tube.

20. The vehicle of claim 19 wherein the first funnel has a first central axis and the second funnel has a second central axis and wherein the first central axis and the second central axis are divergent.

* * * * *